Patented June 3, 1924.

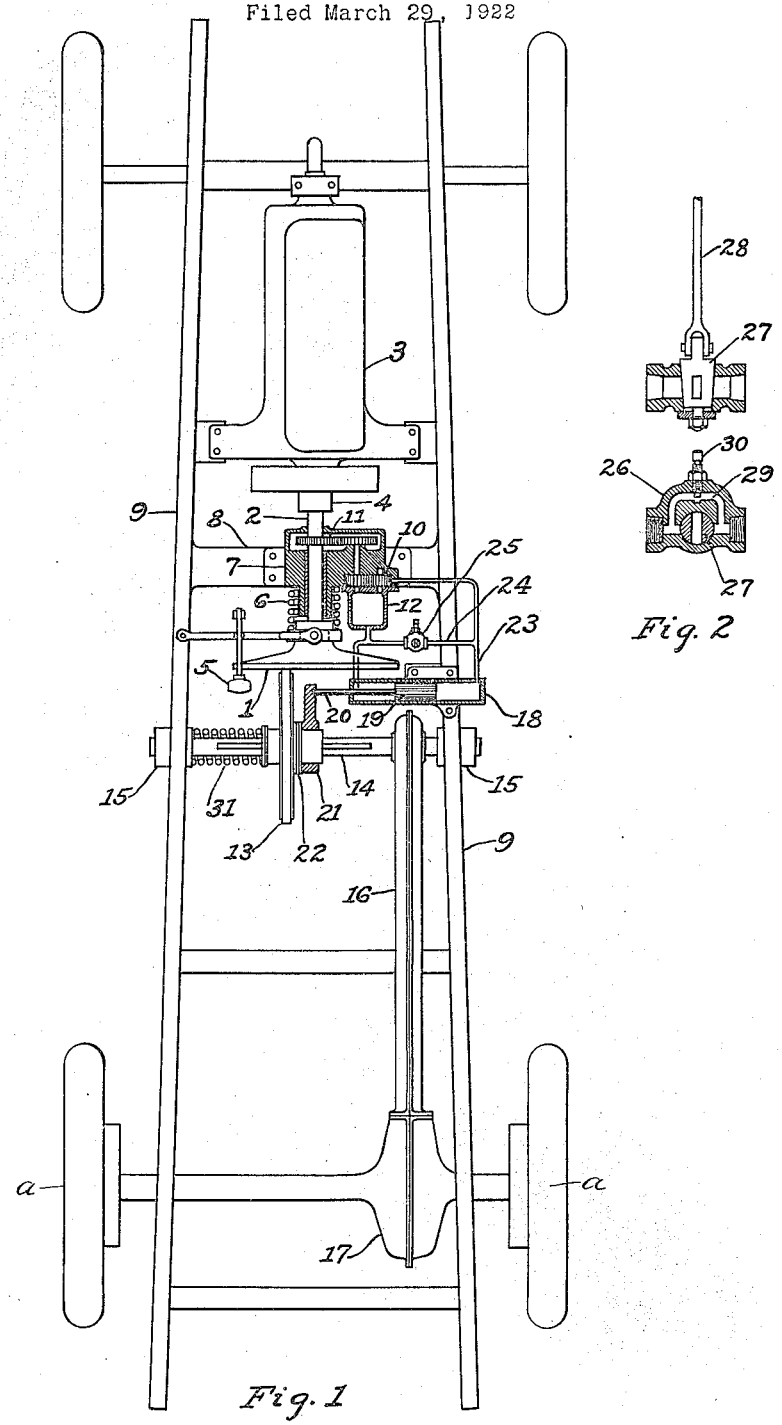

1,496,123

UNITED STATES PATENT OFFICE.

JOSEPH WILLIAM JONES, OF CORNING, NEW YORK.

POWER-TRANSMISSION MECHANISM.

Application filed March 29, 1922. Serial No. 547,900.

*To all whom it may concern:*

Be it known that I, JOSEPH WILLIAM JONES, a citizen of the United States, residing at Corning, in the county of Steuben and State of New York, have invented certain new and useful Improvements in Power-Transmission Mechanism, of which the following is a specification.

This invention appertains to certain improvements in power transmission mechanisms generally, and more particularly to an automatic type of the same adapted for use on motor vehicles or the like.

The principal object of the invention is to provide for a power transmission mechanism of the class set forth, and one of an extremely simple, durable and efficient construction and arrangement of parts, in the operation of which an infinite number of changes in speed are to be obtained automatically.

Another object of the invention is to provide for a mechanism of the class set forth, and one involving a simple, convenient and effective control means, whereby an infinite number of speed ratios, between the prime mover of a motor vehicle and the driving axle or axles thereof, can be obtained automatically, and wherein the speed of the vehicle will be increased or decreased in accordance with the position of the throttle or other controlled device of the prime mover and the road conditions encountered during the running movements of the vehicle.

A further object of the invention is to provide for a transmission mechanism as hereinbefore characterized, and one embodying a governing mechanism, whereby, for a given throttle opening and road condition, the speed ratio of the transmission mechanism can be adjusted by hand to obtain the most desirable effects for the efficient operation of the motor vehicle regardless of the road conditions encountered.

With the foregoing and other important objects in view, the invention resides in the certain novel and useful construction, arrangement and operation of parts as will be hereinafter more fully described, set forth in the appended claims, and illustrated in the accompanying drawing, in which:—

Figure 1 is a plan view of the chassis of a motor vehicle of conventional form, and showing the installation thereon of a preferred embodiment of the automatic power transmission mechanism, and;

Fig. 2 shows enlarged vertical and horizontal longitudinal sections through the regulating valve of the mechanism.

Referring to the drawing, the complete transmission mechanism as shown in Fig. 1 comprises a driving friction disc 1 which is keyed to a shaft 2. This shaft 2 is attached to the driving motor 3 by means of a slip joint connection 4 which permits of a slight endwise movement of the shaft 2 and the friction disc carried thereby, when pedal 5 is depressed sufficiently to compress spring 6. The shaft 2 rotates in and is supported by the housing 7 which is rigidly bolted to a cross member 8 extending transversely of the chassis frame 9. The housing 7 also contains a rotary fluid pump 10 driven from shaft 2 by means of gear wheels 11. The oil reservoir 12 connecting with the inlet of pump 10 is bolted to the housing 7, and also forms a side cover for the two gears of the pump.

The driven friction disc 13 is keyed to the shaft 14, but is free to be moved axially on the shaft so as to engage with different portions of the driving disc 1 at varying distances from the center thereof. As the driven disc 13 is moved from the center towards the outer periphery of the driving disc 1, the speed ratios increase in proportion to the amount of outward movement of the driven disc 13, and if the driven disc 13 is moved over to the other side of the driving disc 1, and past the central point thereof, a reverse motion will be obtained when driving contact is again established between the surfaces of both the discs. To interrupt the drive, the members or discs 1 and 13 are separated by means of a foot pedal 5, and when the faces of these discs are brought together again, the frictional contact between the same, caused by spring 6, permits the disc 13 to drive the shaft 14 and consequently the rear or driving wheel *a* of the vehicle. In this manner both clutching and speed changing functions are combined in one simple mechanism. The counter shaft 14 is supported by end bearings 15 attached at opposite sides of the chassis frame 9, and the drive from this shaft to the rear axle of the vehicle is preferably accomplished by means of silent chains inclosed in case 16 and driving through a differential gearing of conventional design inclosed within housing 17.

The driven friction disc 13 is moved axially along the counter shaft 14 by a fluid operated motor comprising a cylinder 18, in which is slidably mounted a piston 19 provided with an extension 20 which engages an arm 21 bearing against a thrust bearing 22. The right hand end of the cylinder 18 is constantly supplied with fluid through the tube 23 which is connected to the discharge side of the fluid pump 10, and the speed of the fluid pump 10 varies with the speed of the driving motor 3, and hence, the amount of fluid delivered to the cylinder 18 varies with the speed of the driving motor 3. The only outlet from the discharge side of the fluid pump 10, and the right hand end of cylinder 18 is through a tube 24, which is fitted with a regulating valve 25 (shown in enlarged section in Fig. 2), and one end of this tube 24 connects with the reservoir 12, which supplies the inlet of the fluid pump 10, while an extension of the same connects with the left hand end of the cylinder 18 to drain any slight leakage of fluid between cylinder 18 and the piston 19 therein back to the reservoir 12.

The regulating valve 25, as shown in section in Fig. 2, comprises a body 26 fitted with a rotatable plug 27, which is operated by turning a lever 28 mounted at some convenient point on the steering column or dash of the car or vehicle. This plug 27, when turned in a closed position, closes the passage through the tube 24 with the exception of a small opening through the by-pass 29, the size of the latter being regulated by the adjustment of the screw 30, and, when the plug 27 is turned to its open position, a free passage is obtained through tube 24 and the valve 25 has no effect on the flow of fluid therethrough. From the foregoing, it will be seen that for a given motor speed, with plug 27 in its closed position, adjusting screw 30 can be regulated to give either an increase or decrease in the fluid pressure at the right hand side of the piston 19, and, with the plug in its open position, all fluid pressure at the right of the piston 19 is released.

In operation, supposing the car or vehicle is about to be started, and assuming that motor 3 is running and the shaft 2 and driving disc 1 are revolving, with the pedal 5 depressed and latched before starting the motor 3, so that the friction disc 1 is not in contact with the driven disc 13, the plug 27, of the valve 25, will now be closed and pump 10 will deliver fluid through the tube 23 to the right hand end of cylinder 18, when the resultant pressure therein causes piston 19 to compress spring 31 and friction disc 13 to move to the left along counter shaft 14. The pedal 5 is now released gradually and friction disc 1 is forced into contact with friction disc 13, by spring 6, and the car or vehicle starts to move forward. As soon as the two friction discs 1 and 13 engage, motor 3 will slow down to some extent, providing the throttle opening is not changed, and a corresponding reduction of speed will occur in the fluid pump 10 with consequent reduction of pressure at the right of the piston 19, thereby causing friction disc 13 to move to the right and give a lower speed ratio between the discs 1 and 13. An increase in the throttle opening will cause motor 3 and likewise fluid pump 10, to increase their speeds with a consequent increase in pressure at the right of the piston 19, which increase of pressure, causes frictional disc 13 to move to the left again and a higher speed ratio between the motor 3 and the rear wheels of the vehicle is obtained. Now, for a given throttle opening or a certain road condition, it is obvious that, by adjusting regulating screw 30 of the by-pass valve 25, an infinite number of speed ratios can be obtained, and therefore screw 30 can be adjusted to give the most economical condition of operation. Assuming that this screw 30 has been so adjusted and latched in position, and in its operation the car or vehicle encounters a steep grade, the consequent slowing down of the motor 3 will result in the friction disc 13 moving to the right along the counter shaft 14 for the establishing of a lower speed ratio between the motor 3 and the rear wheels a. An increase in throttle opening will cause motor 3 to increase its speed, when disc 13 will move to the left for establishing a higher speed ratio between the same and the driving disc 1 and consequently an increased car speed. It is therefore obvious that the speed ratio between motor 3 and the rear axle of the car or vehicle is automatic and is governed by the throttle opening to the motor and the road conditions encountered in the operating movements of the car or vehicle, and, furthermore, the most desirable ratio for the conditions encountered is always prevalent.

In case it is desired to reverse the direction of movement of the car or vehicle, the pedal 5 is depressed and latched, whereby the friction disc 1 is disengaged from the friction disc 13, when the plug 27 of the valve 25 will be turned to a wide open position, thus relieving all fluid pressure on the piston 19, which allows spring 31 to force the disc 13 to the right along the counter shaft 14 the extreme amount of its travel which brings the same to the right hand side of the center of the driving disc 1 for the desired reverse direction of drive. The pedal 5 is now released, and disc 1 is gradually brought into contact with the disc 13, when the direction of rotation of the latter and the counter shaft 14 is reversed and the car will move in a backward direction. It is to be noted, that the direction of rotation of the motor 3 is preferably anti-clockwise, when standing facing the fly-wheel end thereof, and that suitable stops (not shown) are provided to prevent the driven disc 13 from being moved too far to the right or left along the counter shaft 14, and, also, that suitable thrust bearings, etc., are provided where needed.

It is to be understood that, while a preferred embodiment of the power transmission mechanism has been described and illustrated herein in specific terms and details of construction, arrangement and operation, various changes in and modifications of the same may be resorted to without departing from the spirit of the invention, or the scope of the claims appended hereto.

Having thus fully described the invention, what is claimed, is:—

1. In combination with an automobile or motor vehicle, its driving motor and rear axle, a driving friction disc, a movable driven friction wheel and engaging with said disk and further connected by suitable means to drive the rear wheels of the vehicle, means for moving said wheel across the face of said disc comprising a fluid pump driven by the same motor as the disc, a cylinder and piston operatively connected to said wheel, a discharge pipe leading from said pump to said cylinder, means to provide an escape opening from said fluid pump discharge pipe, a valve provided with a by-pass and controlling said escape opening so as to vary the amount of fluid pressure delivered to said cylinder and piston and further to completely relieve all fluid pressure delivered by said fluid pump.

2. In combination with an automobile or motor vehicle, its driving motor and axles, a friction disc connected to said driving motor, a friction wheel connected by suitable means to drive the rear axle and arranged at right angles to said friction disc in such manner that when said friction wheel is near the outer diameter of said friction disc a high speed ratio is obtained between these two friction elements, when said friction wheel is near the inner diameter of said friction disc a low speed ratio is obtained between these two friction elements, and when said friction wheel is moved to the opposite side of the center of said friction disc a reverse direction of the friction wheel is obtained, means for operating said friction wheel across the face of said friction disc comprising a cylinder and piston operatively connected to said friction wheel, means for supplying fluid pressure constantly to said cylinder to move said piston, an adjustable valve mechanism arranged to control the escape of fluid from said cylinder including a controllable by-pass to restrict the escape of said fluid and further including means to give an unrestricted passage for the escape of all of said fluid.

3. The combination with a motor vehicle including the power motor and the driving axle thereof, of a friction speed changing mechanism interposed between the power motor and the driving axle and including a pair of cooperating rotatable spring controlled frictional contacting elements disposed at rightangles with respect to each other and each axially shiftable in a plane at rightangles to the direction of rotation thereof, one of said elements driven from the other and contacting therewith, a fluid pressure operated means controlled by the speed of the power motor for automatically effecting the position of said driven element with respect to the other of said elements whereby the speed of the vehicle is varied correspondingly with that of the power motor, and means for controlling the application of pressure to said means for varying the speed of the vehicle and further to provide for means for effecting a reversed direction of operation of said speed changing mechanism by overcoming the application of pressure to said means.

4. The combination with the motor shaft of a motor vehicle, and the driving shaft of a motor vehicle, of a spring controlled frictional disk mounted upon and rotated by said driving shaft and further shiftable longitudinally thereof, a pump disposed parallel to said shaft and operatively connected therewith and driven thereby, a transmission shaft disposed at rightangles with respect to the motor shaft, a spring controlled driven frictional disk mounted on and shiftable longitudinally of the transmission shaft and further adapted to operate the latter when driven from the disk carried by the motor shaft, a fluid pressure operated element connected with the disk on the transmission shaft for shifting said disk across the face of the disk on the motor shaft for varying the speed of the vehicle, a driving connection between the transmission shaft and said axle, and valve controlled connections between said pump and said fluid pressure operated means for controlling the application of pressure to said means for varying the speed of the vehicle and further for effecting a reversed direction of movement of the vehicle by overcoming the application of pressure to said means.

5. The combination with the motor shaft of a motor vehicle, and the driving shaft of a motor vehicle of a spring controlled frictional disk mounted upon and rotated by said shaft and further shiftable longitudinally thereof, a pump disposed parallel to said shaft and operatively connected therewith and driven thereby, a transmission shaft disposed at rightangles with respect to the motor shaft, a spring controlled driven frictional disk mounted on and shiftable longitudinally of the transmission shaft and further adapted to operate the latter when driven from the disk carried by the motor shaft, a fluid pressure operated element connected with the disk on the transmission shaft for shifting said disk across the face of the disk on the motor shaft for varying the speed of the vehicle, a driving connection between the transmission shaft and said axle, valve controlled connections between said pump and said fluid pressure operated means for controlling the application of pressure to said means for varying the speed of the vehicle and further for effecting the reversed direction of movement of the vehicle by overcoming the application of pressure to said means.

In testimony whereof, I affix my signature hereto.

JOSEPH WILLIAM JONES.